(12) United States Patent
Dong et al.

(10) Patent No.: US 12,183,134 B2
(45) Date of Patent: Dec. 31, 2024

(54) POWER OFF AND POWER ON METHOD AND APPARATUS FOR AN IN-VEHICLE SYSTEM

(71) Applicant: Intel Corporation, Santa Clara, CA (US)

(72) Inventors: Yao Zu Dong, Shanghai (CN); Shuo Liu, Shanghai (CN); Di Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1022 days.

(21) Appl. No.: 17/055,544

(22) PCT Filed: Sep. 26, 2018

(86) PCT No.: PCT/CN2018/107574
§ 371 (c)(1),
(2) Date: Nov. 13, 2020

(87) PCT Pub. No.: WO2020/061805
PCT Pub. Date: Apr. 2, 2020

(65) Prior Publication Data
US 2021/0225096 A1 Jul. 22, 2021

(51) Int. Cl.
*G07C 5/08* (2006.01)
*G06F 9/4401* (2018.01)
*G06F 9/455* (2018.01)

(52) U.S. Cl.
CPC .......... *G07C 5/085* (2013.01); *G06F 9/4401* (2013.01); *G06F 9/45545* (2013.01);
(Continued)

(58) Field of Classification Search
None
See application file for complete search history.

(56) References Cited

U.S. PATENT DOCUMENTS 8,407,518 B2   3/2013 Nelson et al.
9,317,299 B2 *  4/2016 Zeng ............... G06F 9/4406
(Continued)

FOREIGN PATENT DOCUMENTS

CN   101916201 A   12/2010
CN   103309771 A    9/2013
(Continued)

OTHER PUBLICATIONS

Knauth et al., Fast Virtual Machine Resume for Agile Cloud Services, Sep. 2013, CGC, pp. 1-8) (Year: 2013).*
(Continued)

*Primary Examiner* — Kenneth Tang
*Assistant Examiner* — Melissa A Headly
(74) *Attorney, Agent, or Firm* — Schwegman Lundberg & Woessner, P.A.

(57) ABSTRACT

Apparatuses, methods and storage medium associated with in-vehicle computing, are disclosed herein. In embodiments, an in-vehicle system computing platform having a hypervisor to host one or more virtual machines (VMs) includes a memory shrink manager, and a memory snapshot manager. The memory shrink manager is configured to orchestrate shrinking a memory footprint of one of the one or more VMs for a suspend process invoked in response to the computing platform being powered off. The memory snapshot manager is configured to save the shrunken memory footprint of the one VM to the persistent storage during the suspend process, and to reload a subset of the saved shrunken memory footprint during a resume process to resume the one VM from suspension to the persistent storage. The resume process is invoked in response to the computing platform being powered on, cold booted.

18 Claims, 9 Drawing Sheets

(52) U.S. Cl.
CPC ............ *G06F 9/45558* (2013.01); *G06F 2009/45575* (2013.01); *G06F 2009/45583* (2013.01)

(56) References Cited

U.S. PATENT DOCUMENTS

| | | | | |
|---|---|---|---|---|
| 2010/0293146 | A1* | 11/2010 | Bonnet | G06F 9/455 |
| | | | | 718/1 |
| 2014/0173213 | A1* | 6/2014 | Beveridge | G06F 9/4856 |
| | | | | 711/130 |
| 2014/0366019 | A1 | 12/2014 | Bajaj et al. | |
| 2015/0058519 | A1 | 2/2015 | Armstrong et al. | |
| 2015/0229717 | A1* | 8/2015 | Gupta | H04L 67/34 |
| | | | | 718/1 |
| 2016/0055021 | A1* | 2/2016 | Beveridge | G06F 9/45558 |
| | | | | 718/1 |
| 2017/0039083 | A1* | 2/2017 | Kitano | G06F 9/485 |
| 2017/0286153 | A1 | 10/2017 | Bak et al. | |
| 2018/0165101 | A1* | 6/2018 | Bulusu | G06F 11/1438 |

FOREIGN PATENT DOCUMENTS

| | | |
|---|---|---|
| CN | 103729264 A | 4/2014 |
| CN | 105306225 A | 2/2016 |
| CN | 107615255 A | 1/2018 |
| CN | 112703483 | 4/2021 |
| EP | 3857358 | 8/2021 |
| GB | 2 529 204 A | 2/2016 |
| WO | 2020061805 | 4/2020 |

OTHER PUBLICATIONS

International Search Report and Written Opinion mailed Jun. 24, 2019 for International Patent Application PCT/CN2018/107574, 10 pages.

Extended European Search Report mailed Apr. 13, 2022 for European Patent Application No. 18935705.6, 13 pages.

Karthik SH Ravan et al., "Hypervisor based approach for integrated cockpit solutions", 2018 IEEE 8th InternationalConference on Consumer Electronics—Berlin (ICCE—Berlin), IEEE, Sep. 2, 2018 (Sep. 2, 2018), pp. 1-6.

Jan Pelzl et al.,"Virtualization Technologies for Cars Solutions to increase safety and security of vehicular ECUs",, Dec. 31, 2008(Dec. 31, 2008), pp. 1-10.

Xia Yang et al., "Improving the Boot Time of the AndroidOS", IEEE Computer Society, pp. 1-9 (Jan. 1, 2013), DOI: 10.1109/MC.2013.264.

Xia Yang et al., "Shortening the Boot Time of Android OS", IEEE Computer Society, pp. 53-58 (Jul. 2014).

Office Action mailed Aug. 23, 2023 for European Patent Application No. 18935705.6, 8 pages.

Auto Motor und Sport Redaktion: "Drei Infotainment-Systeme bei BMW, Porsche und Mercedes im Vergleich | Test | auto motor und sport", 8 pages (Feb. 22, 2009), https://web.archive.org/web/20090222101414/http://www.auto-motor-und-sport.de:80/testbericht/drei-infotainment-systeme-bei-bmw-porsche-und-mercedes-im-vergleich-983796.html.

"International Application Serial No. PCT CN2018 107574, International Preliminary Report on Patentability mailed Apr. 8, 2021", 5 pgs.

"European Application Serial No. 18935705.6, Response filed Oct. 26, 2022 to Extended European Search Report mailed Apr. 13, 2022", 65 pgs.

"European Application Serial No. 18935705.6, Response filed Nov. 20, 2023 to Communication Pursuant to Article 94(3) EPC mailed Aug. 23, 2023", 18 pgs.

"European Application Serial No. 18935705.6, Communication Pursuant to Article 94(3) EPC mailed Jul. 17, 2024", 6 pgs.

* cited by examiner

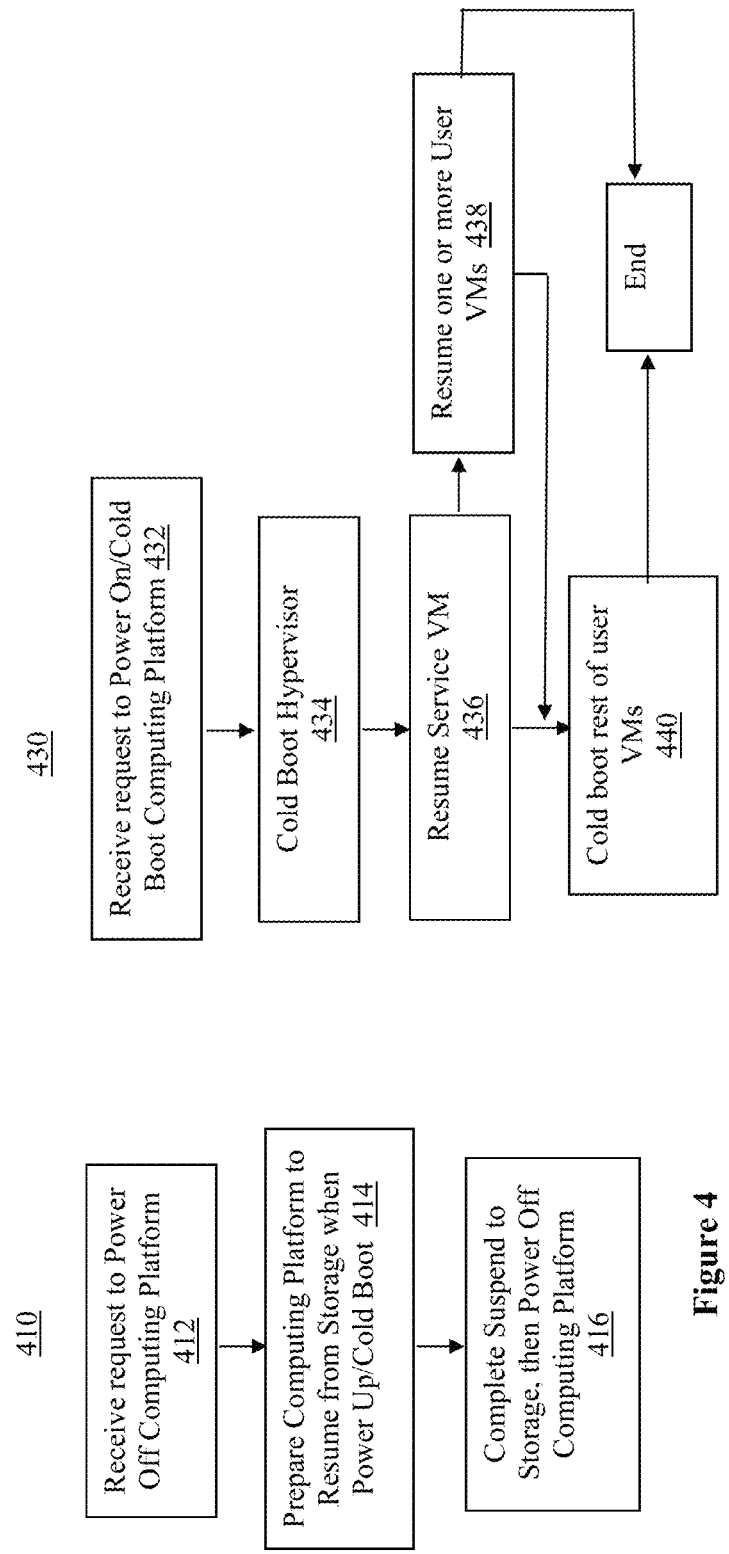

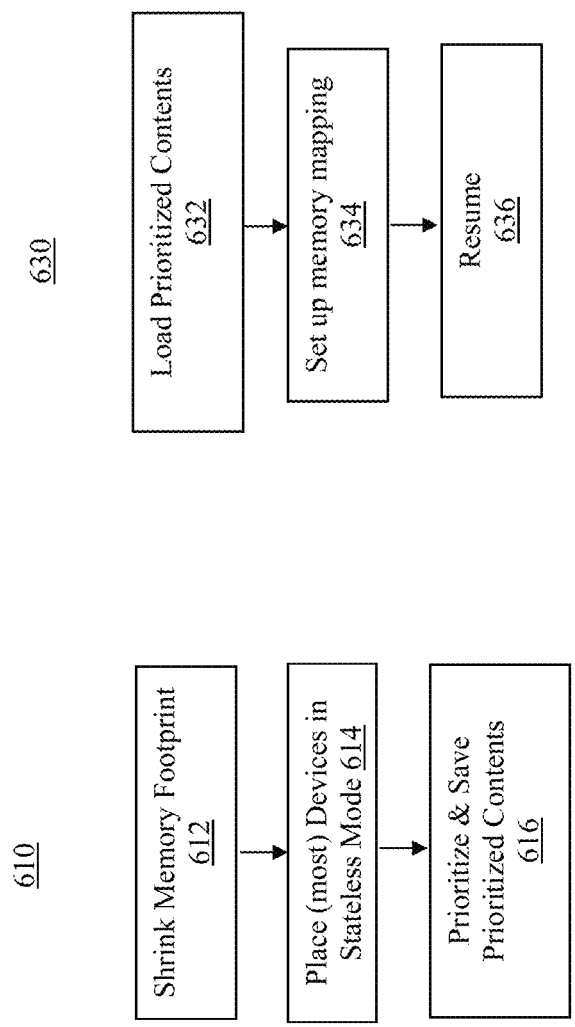

POWER OFF AND POWER ON METHOD AND APPARATUS FOR AN IN-VEHICLE SYSTEM

CROSS REFERENCE TO RELATED APPLICATIONS

The present application is a national phase entry under 35 U.S.C. § 371 of International Application No. PCT/CN2018/107574, filed Sep. 26, 2018, entitled "POWER OFF AND POWER ON METHOD AND APPARATUS FOR AN IN-VEHICLE SYSTEM", which designated, among the various States, the United States of America. The Specifications of the PCT/CN2018/107574 Application is hereby incorporated by reference.

TECHNICAL FIELD

The present disclosure relates to the field of computer-assisted or autonomous driving (CA/AD). More particularly, the present disclosure relates to power off and power on method and apparatus for in-vehicle systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Nowadays, more and more vehicle vendors and original equipment manufacturers (OEMs) are looking for a consolidated platform for automotive in-vehicle systems, often referred to as Software Defined Cockpit (SDC) or In Vehicle Entertainment Experience (IVE). The desire is to utilize virtualization technology to nm several guest operating systems (OS) on top of a Hypervisor, sharing the one powerful computing platform, e.g., one of the powerful computing platforms available from Intel of Santa Clara, Calif. For such architecture, the Hypervisor in cooperation with a service OS (SOS) would provide the virtualization support to the guest OS's. Examples of guest OS's may include, but are not limited to, a guest OS to host Instrument cluster applications, a guest OS to host front seat information and entertainment applications, a guest OS to host rear seat entertainment application, and so forth.

However, from a power consumption perspective, the in-vehicle system (including the underlying computing platform) must be powered off, when the engine of the vehicle is turned off (Key Off). Leaving the in-vehicle system in a suspended state, e.g., suspended to memory, will consume too much power, as substantial amount of power is required to maintain the contents in memory. Moreover, the duration of suspension could be rather lengthy. A typical automotive system turns off power when the car is not in use, to save power consumption. The industry requirement is to stay with under 10 mw for all electronic systems at idle, including electronic control units (ECUs), making it very difficult to meet with a powerful consolidated computing platform.

For some computing platforms, suspend to persistent storage device may meet the power requirement, but there is requirement to have certain functionalities available in seconds when the engine of the vehicle is turned on (Key On). For example, there are regulations that require the available time of the rear view camera be in 2 seconds from Key On. Today, typical persistent storage devices are not fast enough to meet the requirements. For example, a typical embedded multi-media card (EMMC) can only achieve 200 MB/s read speed and the write speed is much slower. That means reading the guest OS's memory contents from persistent storage, for a typical guest OS with 2 GB memory, would take at least 10 seconds, which is too slow.

For the full power off option, in order to meet the aforementioned timing requirements for certain critical functionalities in the aforementioned SDC system using a consolidate powerful computing platform, the instrument cluster application would likely be nm within the SOS. But that does not fully resolve the problem, as the front seat in-vehicle infotainment (IVI) applications, and different rear seat entertainment applications would run on their respectively guest OS's. The boot time of these entertainment systems running in their respective guest OS's, i.e., the time from Key On to the time the entertainments can play, needs to remain relatively short, as it is important to the overall user experience. Experience has shown that the cold boot time of some of today's popular guest OS's (such as Android) operating on some of the likely candidate computing platforms powerful enough to serve as the consolidated computing platform may not be fast enough to provide the desired user experience.

The likely candidate computing platforms tend to have a longer boot process. Similarly, the popular guest OS's tend to require a lot of comprehensive service to be started, and is not designed for frequent cold boot. Further, with virtualization, the guest OS's boot relies on the Hypervisor and SOS. One approach is to optimize the cold boot flow. The essentials of this optimization mainly lies on 1) parallel execution, and 2) deferring non-critical operation to a later time. Experiments have shown that the approach may be able to keep the cold boot sequence for some of the powerful computing platforms to about 10 seconds. However, 10 seconds boot time is longer than the typical less than 7 seconds expectation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 4 and 5 illustrate an example power off process, and an example power on process for the in-vehicle system, according to various embodiments.

FIGS. 6 and 7 illustrate an example suspend process during power off, and an example resume process during power on, according to various embodiments.

DETAILED DESCRIPTION

Figure 1:
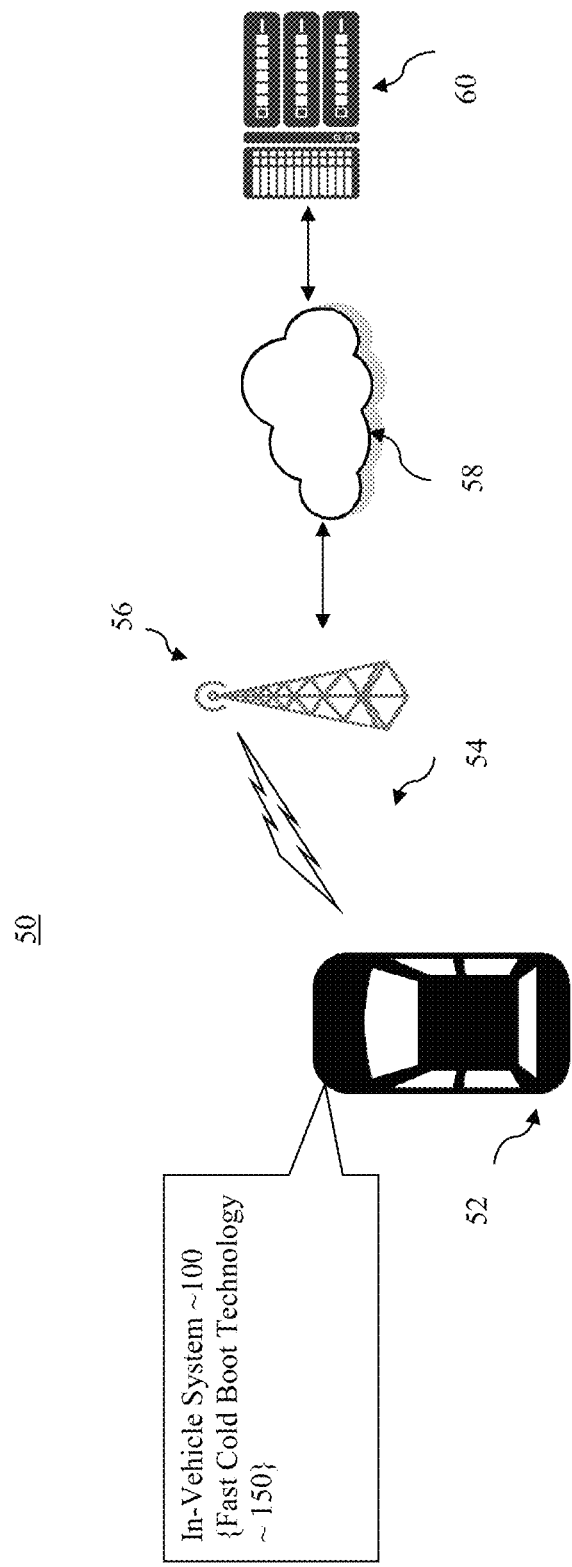
FIG. 1 illustrates an overview of an environment for incorporating and using the fast cold boot technology of the present disclosure, in accordance with various embodiments.

To address challenges discussed in the background section, apparatuses, methods and storage medium associated with in-vehicle computing having fast cold boot technology, are disclosed herein. In embodiments, an in-vehicle system computing platform having a hypervisor to host one or more virtual machines (VMs) is incorporated with the fast cold boot technology of the present disclosure. The fast cold boot technology includes a memory shrink manager, and a memory snapshot manager. The memory shrink manager is configured to orchestrate shrinking a memory footprint of one of the one or more VMs for a suspend process to suspend the one VM into persistent storage. The suspend process is invoked in response to the computing platform being powered off, and the computing platform, on suspension of the one VM to persistent storage, proceeds to power off. The memory snapshot manager is configured to save the shrunken memory footprint of the one VM to the persistent storage during the suspend process, and to reload a subset of the saved shrunken memory footprint during a resume process to resume the one VM from suspension to the persistent storage. The resume process is invoked in response to the computing platform being powered on, cold booted. The in-vehicle system is powered off when an engine of the vehicle is turned off.

In embodiments, the one VM may be a selected one of a service VM or a user VM. In embodiments, components of the fast cold boot technology may be deployed respectively for the service VM and the user VMs. The service VM may support the user VMs. The service VM may also host instrument cluster applications. The user VMs may respectively host front seat in-vehicle infotainment application, various rear seat entertainment applications, and so forth.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the fast cold boot technology of the present disclosure, in accordance with various embodiments, is shown. As illustrated, in embodiments, example environment 50 includes vehicle 52 having an engine, transmission, axles, wheels and so forth. Further, vehicle 52 includes IVI system 100 having a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications. Further, IVI system 100 is provided with fast cold boot technology 150 of the present disclosure, allowing IVI system 100 to be powered off when the engine is turned off (also referred to as key offed), yet appears to be instantaneously available when IVI system 100 is powered on when the engine is turned on (also referred to as Key On).

In embodiments, IVI system 100, on its own or in response to the user interactions, may communicate or interact with one or more off-vehicle remote content servers 60, via a wireless signal repeater or base station on transmission tower 56 near vehicle 52, and one or more private and/or public wired and/or wireless networks 58. Examples of private and/or public wired and/or wireless networks 58 may include the Internet, the network of a cellular service provider, and so forth. It is to be understood that transmission tower 56 may be different towers at different times/locations, as vehicle 52 en routes to its destination.

Figure 2:
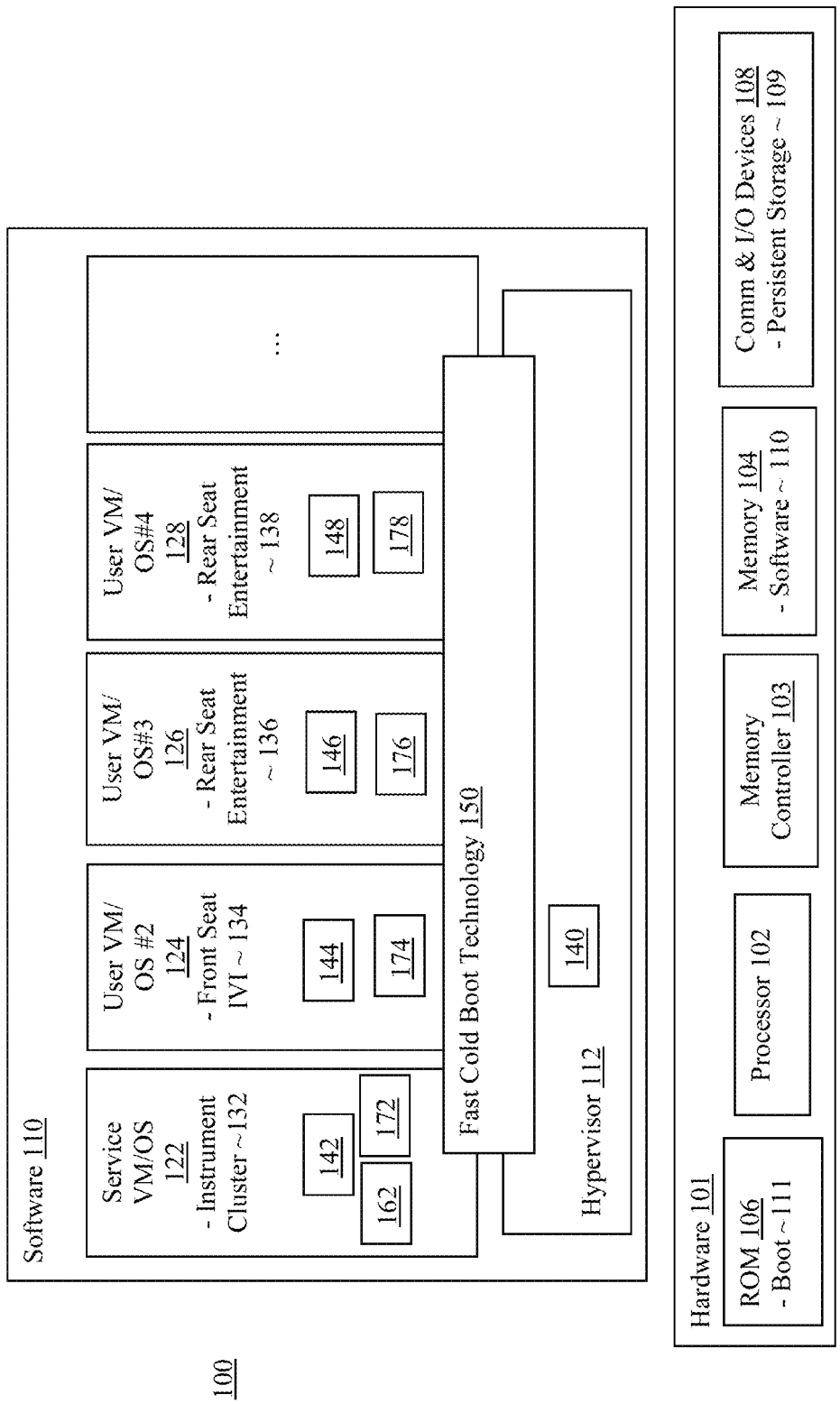
FIG. 2 illustrates a hardware/software view of the in-vehicle system of FIG. 1 in further details, according to various embodiments.

Referring now FIG. 2, wherein a hardware/software view of the in-vehicle system of FIG. 1, according to various embodiments, is shown in further details. As illustrated, for the embodiments, in-vehicle system 100 include hardware 101 and software 110. Hardware 101 includes processor 102, memory controller 103, memory 104, read-only memory (ROM) 106, and communication and/or input/output (I/O) devices 108. Memory 104 includes software 110, while ROM 106 includes a boot program 111.

Software 110 includes hypervisor 112 hosting a number of VMs 122-128. Hypervisor 112 is configured to host execution of VMs 122-128. The VMs 122-128 include a service VM 122 and a number of user VMs 124-128. Service VM 122 includes a service OS hosting execution of a number of instrument cluster applications 132. User VMs 124-128 may include a user VM 124 having a user OS hosting execution of front seat infotainment applications 134, and a number of additional user VMs 126-128 having corresponding user OS hosting execution of corresponding rear seat entertainment application 136-138 and so forth.

To enable in-vehicle system 100 to be powered off, when the engine of vehicle 52 is keyed off, yet appears to be instantaneously available to a user when in-vehicle system 100 is powered on, when the engine of vehicle 52 is keyed on, software 110 is incorporated with fast cold boot technology 150 of the present disclosure. In embodiments, fast cold boot technology 150 includes various components distributed in hypervisor 112 and/or VMs 122-128, to be described more fully below. To effectuate the desired powered off and yet appears to be instantaneously available at power on, in embodiments, the various components of fast cold boot technology 150 are arranged to initiate a suspense to storage process during power off, to suspend one or more VMs 122-128, before powering off WI system 100, and at power on, fast cold boot technology 150 initiates a "lazy" resume process, resuming the suspended one or more VMs 122-128, but reloading only a subset of the memory contents of the one or more VMs 122-128 suspended to persistent storage.

In embodiments, to facilitate power management, each of hypervisor 112 and OS of VMs 122-128 may include a power manager 140-146. In embodiments, power managers 140-146 are configured to manage power states of hypervisor 112 and VMs 122-128 in compliant with the Advanced Configuration and Power Interface (ACPI) standard. In embodiments, OS of service VM 122 may further include device model 162. Device model 162 may be configured to virtualize the devices of user VMs 124-128. In addition, it may be configured to handle the suspension and resumption of the virtual devices. In embodiments, each OS of service VM 122 and user VM 124-128 may further include a memory manager 172-178 to manage allocation of memory to various services and/or applications running within the respective VMs.

Except for fast cold boot technology 150 of the present disclosure incorporated in hypervisor 112 and VMs 122-128, elements 102-108 of hardware 101 and elements 112-138 of software 110 may be any one of a number of these elements known in the art. For example, processor 102 may be any one of a number of multi-core processors known in the art, such as those available from Intel® of Santa Clara, Calif. Memory 104 may be any one of a number of volatile memory known in the art, including traditional dynamic random access memory (DRAM) or advanced cross point memory. Memory controller 103 may simply provide access control, that is read and/or write to memory 104, or including advanced functions, such as encryption/decryption services. ROM 106 may be any one of a number of persistent read only memory known in the art, such as but not limited to Electrically Erasable Programmable Read-Only Memory (EEPROM). Boot program 111 may likewise be any one of a number of boot programs known in the art, such as a primary or secondary boot loader (SBL), a multi-boot program, e.g., Grub, or an automotive boot loader (ABL). Boot program 111 may be part of a basic input/input system (BIOS).

Communication and I/O devices 108 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G) and so forth. Examples of I/O devices may include, but are not limited to, persistent storage 109, display, keyboards, cursor control (mouse, trackball, etc), and so forth. In embodiments, persistent storage 109 may be used to provide swap space for swapping memory content out of memory 104, to allow that portion of memory 104 to be re-allocated for other use, or memory 104 to be shut down. Persistent storage 109 may also be used to store memory contents when computing platform of in-vehicle system 100 is suspended to storage.

Hypervisor 112 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 122 and user OS of user VMs 124-128 may be any one of a number of OS known in the art, such as Linux, available e.g., from Red Hat Enterprise of Raliegh, N.C., or Android, available from Google of Mountain View, Calif.

Figure 3A:
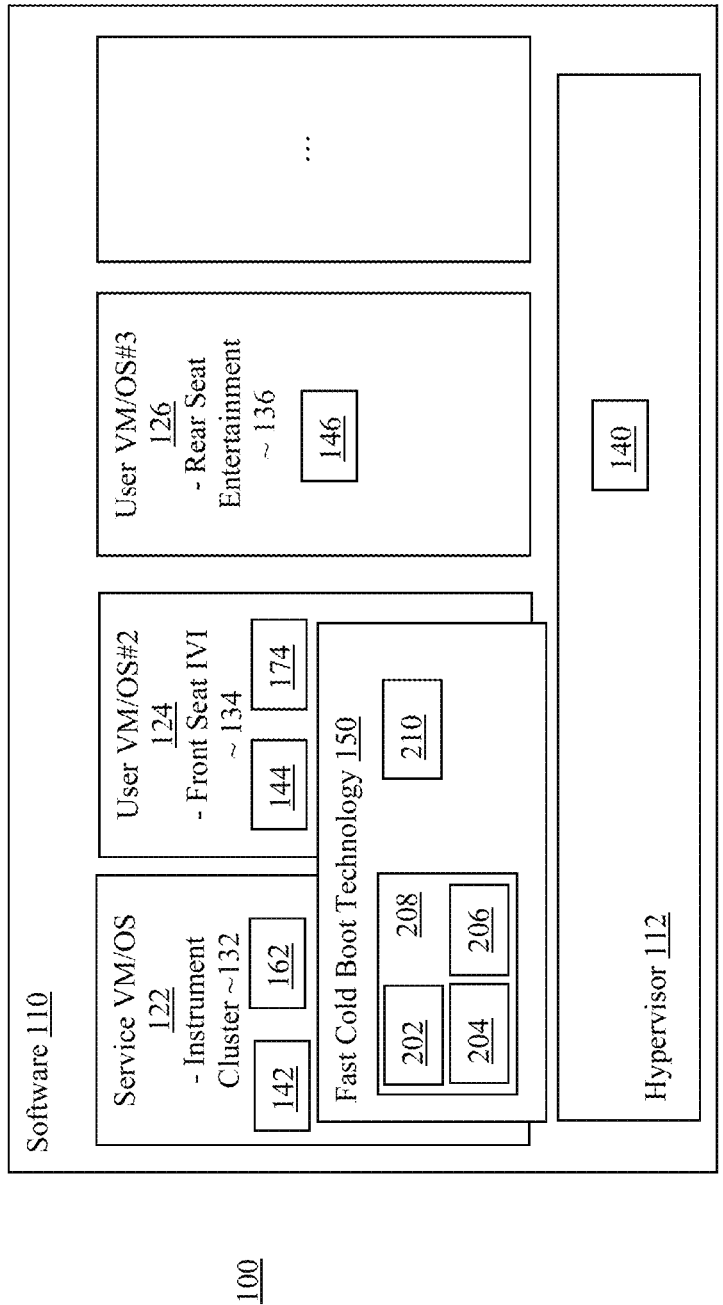
FIGS. 3A-3B illustrate the various components of the fast cold boot technology of the present disclosure, according to various embodiments.
Figure 3B:
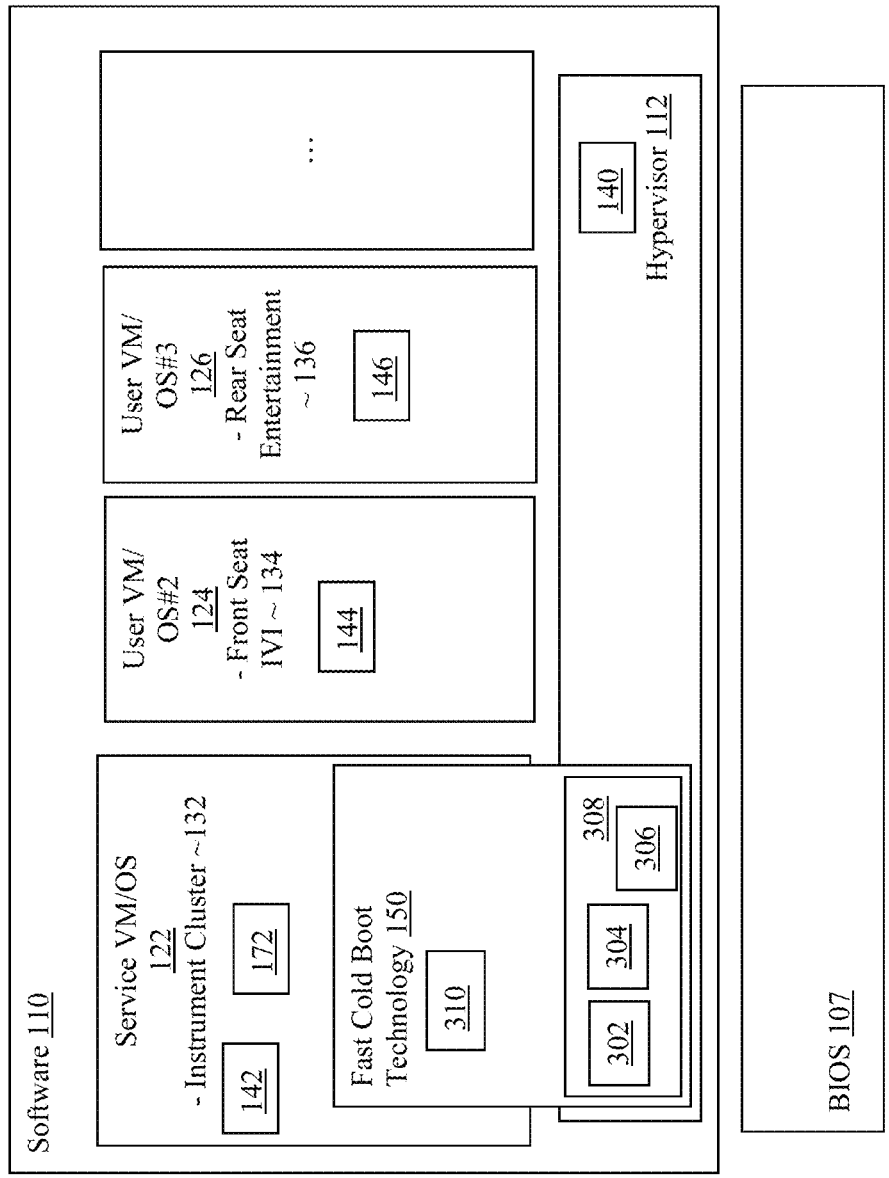

Referring now to FIGS. 3A-3B, wherein the various components of the fast cold boot technology of the present disclosure, according to various embodiments, are shown. FIG. 3A illustrates embodiments where the target is to have at least the applications hosted by one of the user VMs 124, such as the front seat infotainment applications 134, appear to be substantially instantaneously to a user when in-vehicle system 100 is powered on, cold booted, in response to the engine of the vehicle being keyed on, after it has been powered off, in response to the engine of the vehicle being keyed off. FIG. 3B illustrates alternate embodiments where the target is to have at least the applications hosted by service VM 122, such as instrument cluster 132, appear to be substantially instantaneously to a user when in-vehicle system 100 is powered on, cold booted, in response to the engine of the vehicle being keyed on, after it has been powered off, in response to the engine of the vehicle being keyed off.

For the embodiments of FIG. 3A, fast cold boot technology 150 include memory shrink manager 210, and memory snapshot manager 208 having snapshot saver 202, "lazy" memory loader (or "lazy" loader) 204, and snapshot mapper 206. Memory snapshot manager 208 is disposed in service VM 122, while memory shrink manager 210 is disposed in user VM 124.

Memory shrink manager 210 is configured to shrink the memory footprint of user VM 124, in particular, prior to suspending user VM 124 to storage while powering off. Memory snapshot manager 208 is configured to save and restore a snapshot of the memory of user VM 124, respectively, during the suspend to storage process while system 100 powering off, and during the resume process, while system 100 is powering on. In particular, snapshot saver 202 is configured to save a snapshot of the memory of user VM 124 during the resume. "Lazy" loader 204 is configured to load only a subset of the memory snapshot of user VM 124, the highest priority memory with the content to provide the instantaneous availability appearance, when user VM 124 is being resumed from suspension to storage. "Lazy" loader 204 is configured to load the rest of the memory snapshot of user VM 124 only when user VM 124 actually accesses the rest of the memory. That's why loader 204 is referred to as a "lazy" loader. Snapshot mapper 206 is configured to construct the mapping to physical memory to allow subsequent retrieval of the memory content when they are accessed.

Memory shrink manager 210 is configured to coordinate the various tasks being performed to shrink the memory footprint of user VM 124 during the suspension to storage of user VM 124, to enable user applications 134 of user VM 124 to appear available instantaneously when in-vehicle system is being powered on, after it is has been powered off. These tasks may include shrinking the memory footprint of user VM 124, and/or prioritizing the memory pages of user VM 124 being saved, and so forth, thereby enabling fast resumption of user VM 124, rendering its applications 134 to appear available instantaneously when in-vehicle system 100 is being powered on, after it is has been powered off.

For the embodiments of FIG. 3B, fast cold boot technology 150 includes memory shrink manager 310, and memory snapshot manager 308 having snapshot saver 302, "Lazy" memory loader (or simply, "lazy" loader) 304, and snapshot mapper 306. Parallel to the embodiments of FIG. 3A, memory shrink manager 310 is disposed in service VM 122, the target VM, and memory snapshot manager 308 is disposed in hypervisor 112 instead, to "service" the target VM.

Similar to memory shrink manager 210, memory shrink manager 310 is configured to shrink the memory footprint of service VM 122, in particular, prior to suspending service VM 122 to storage while powering off Memory snapshot manager 308 is configured to save and restore a snapshot of the memory of service VM 122, respectively, during the suspend to storage process while system 100 powering off, and during resume while system 100 is powering on. In particular, snapshot saver 302 is configured to save a snapshot of the memory of service VM 122. "Lazy" loader 304 is configured to the load only a subset of the memory of service VM 122, the highest priority memory with the content to provide the instantaneous availability appearance, when service VM 122 is being resumed from suspension to storage. "Lazy" loader 304 is configured to load the rest of the memory snapshot of service VM 122 only when service VM 122 actually accesses the rest of the memory snapshot. That's why loader 304 is similarly referred to as a "lazy" loader. Snapshot mapper 306 is configured to construct the mapping to physical memory f during power on, to subsequent retrieval of the memory content when they are accessed.

Memory shrink manager 310 is configured to coordinate the various tasks being performed during the suspension and resumption of service VM 122, to enable applications 132 of service VM 122 to appear available instantaneously when in-vehicle system is being powered on, after it is has been powered off. These tasks may include shrinking the memory footprint of service VM 122, and/or prioritizing the memory pages of service VM 122 being saved, and so forth, thereby enabling fast resumption of service VM 122, rendering its applications 132 to appear available instantaneously when in-vehicle system 100 is being powered on, after it is has been powered off.

Referring now to FIGS. 4 and 5, wherein an example power off process, and an example power on process for the in-vehicle system, according to various embodiments, are shown. More specifically, FIG. 4 illustrates example power off process 410, whereas FIG. 5 illustrates example power on process 430, respectively, according to various embodiments. As illustrated in FIG. 4, for the embodiments, power off process 410 may include the operations performed at blocks 412-416, whereas power on process 430 may include the operations performed at blocks 432-436. The operations may be performed by the components of hypervisor 112 and service or user OS of service or user VM 122 or 124 (such as power manager 140-144, device model 162, and so forth), and/or components of fast cold boot technology 150 (in particular, memory shrink manager 210 or 310 and memory snapshot manager 208 or 308).

Power off process 410 may start block 412. At block 412, a request to power off the computing platform of an in-vehicle system is received, e.g., by a power manager of the service OS of service VM 122. Next, at block 414, in response to the receipt of the request to power off the computing platform, preparation may be performed, e.g., by one or more components of fast cold boot technology 150, such that the computing platform may be resumed from suspension to storage when the computing platform is subsequently powered on, cold booted, after it has been powered off. Preparation of the computing platform to allow the computing platform to be resumed from suspension to storage when the computing platform is subsequently powered on, cold booted, after it has been powered off, will be further described below with references to FIGS. 6-8.

At block 416, after the computing platform has been prepared to resume from suspension to storage when the computing platform is subsequently powered on, cold booted, after it has been powered off, the computing platform may complete the suspend to storage process, and thereafter, power itself off, resulting in erasure of all current content in memory 104. In various ACPI embodiments, virtual ACPI of vSBL or real ACPI of real SBL may be used to notify the platform to complete the suspension to storage, such as by writing the pattern in real time clock (RTC) complementary metal-oxide-semiconductor (CMOS) random access memory (RAM) of the computing platform. The vACPI process may be trapped by either the hypervisor or the SOS, and control may then be taken by the SOS to complete the rest of the suspension to storage process. Thereafter, the computing platform powers itself off.

As shown in FIG. 5, for the embodiments, power on process 430 may start at block 432. At block 432, a request to power on, cold boot the computing platform of an in-vehicle system is received, e.g., by a boot loader of the computing platform. Next, at block 434, in response to the receipt of the request to power on, cold boot the computing platform, a hypervisor of the computing platform is cold booted. At block 436, after cold booting the hypervisor, a resume process is invoked to resume a service VM of the computing platform suspended to storage, in lieu of cold booting the service VM. In embodiments, the BIOS/SBL/ABL may use whatever platform specific method, such as RTC RAM to recognize and switch the cold boot process to resume from suspension. Resumption of the service VM will be further described below with references to FIGS. 6-8.

From block 436, process 430 may proceed to block 438 or block 440, depending on whether at least one user VM has been suspended to storage when the computing platform last powered down. Process 430 proceeds to block 438, if at least one user VM (e.g., a user VM with high priority user applications, such as front seat infotainment applications) has been suspended to storage when the computing platform last powered down, otherwise, process 430 proceeds to block 440. At block 438, the resume process continues to resume the one or more user VMs previously suspended to storage when the computing platform last powered down. Resumption of a user VM will likewise be further described below with references to FIGS. 6-8.

On resuming all user VMs previously suspended to storage when the computing platform last powered down, from block 438, process 430 proceeds to block 440, if at least one user VM (e.g., a user VM with low priority user applications) was not suspended to storage when the computing platform last powered down, else process 430 may end. At block 440, the rest of the user VMs that were not suspended to storage when the computing platform last powered down, are cold booted. Thereafter, process 430 ends.

Thus, a "cold boot" is effectively accomplished in the expected short time. In case (for some reason), the user VM access a memory page that is not loaded yet, a VM exit may happen (e.g., an extended memory page table (EPT) violation), and the hypervisor knows that the user VM is accessing a memory page that is not loaded yet. The hypervisor may halt the execution of the virtual CPU hosting execution of the user VM temporarily, and notify the memory snapshot manager 208 or 308 to load the missing memory page first. Once the missing memory page is loaded, execution of the virtual CPU hosting execution of the user VM may resume.

Referring now to FIGS. 6 and 7, wherein an example suspend process during power off, and an example resume process during power on, according to various embodiments, are illustrated. More specifically, FIG. 6 illustrates example suspend process 610 invoked during power off, whereas FIG. 7 illustrates example resume process 630 invoked during power on, respectively, according to various embodiments. As illustrated in FIG. 6, for the embodiments, suspend process 610, invoked during power off, may include the operations performed at blocks 612-616, whereas resume process 630, invoked during power on, may include the operations performed at blocks 632-636. The operations may be performed by the components of hypervisor 112 and service or user OS of service or user VM 122 or 124 (such as power manager 140-144, device model 162 and so forth), and/or components of fast cold boot technology 150 (in particular, memory shrink manager 210 or 310 and memory snapshot manager 208 or 308).

As shown in FIG. 6, suspend process 610, invoked during power off of the in-vehicle system, may start at block 612. At block 612, operations are undertaken to shrink the memory footprint of the service/user VM. Shrinkage of the memory footprint of the service/user VM will be further described below with references to FIG. 8. Next, at block 614, the virtualized devices of the user VM are shut down, and placed in a stateless mode (by e.g. device model 162). In various Android embodiments, the Android OS may be informed (e.g., by the memory shrink manager 210/310) to start the process of device state saving. In some Android embodiments, the Android OS may release the usage of the device by forcing the user application to background, or informing the user application to end. In other Android embodiments, the Android OS may use other internal mechanisms, such as Linux' dynamic device power management mechanism, to save the state of the device. In various embodiments, the display hardware may be optimized to be saved last, so that the display hardware is subsequently resumed first, during power on, allowing contents to be quickly displayed for better user experience.

At block 616, contents in the memory of the service/user VM are prioritized. In embodiments, the prioritization may be based on the importance of having the content available to the user as soon as the in-vehicle system is powered on. For example, GPU driver code/data frame buffer, OS kernel code, and so forth are necessary to show any display to a user at the time of resume, during power up. On prioritization of the contents in the memory of the service/user VM, the contents are saved into persistent storage in order of their priorities. The saving of the prioritized contents may be in the order of their priorities to facilitate the high priority content being retrieved first, when subsequently resume from storage during power on.

As shown in FIG. 7, resume process 630, invoked during power on of the in-vehicle system, may start at block 632. At block 632, the highest priority memory content, i.e., those memory contents that need to be available to the user are loaded into memory from persistent storage. Further, the mapping (e.g., an extended page table) for the loaded content memory pages are set up (e.g., by the snapshot mapper 206/306 of memory snapshot manager 208/308). The loading of memory contents will be further described later with references to FIG. 8. Next, at 634, the memory mapping for the remainder contents are set up (e.g., by the snapshot mapper 206/306 of memory snapshot manager 208/308), to facilitate their subsequent access/retrieval. In embodiments, an extended page table associated with accessing the remainder contents is set up. In embodiments, after the memory mapping for the remainder contents have been set up, the vSBL of the service/user VM may be notified to continue with the resume from storage process. At block 636, the service/user VM is resumed back into the full power on state (e.g., ACPI S0 working state). On resumption, the service/user VM restores the device states. Once the states of the GPU and the display have been restored, content may be displayed for the user. Once the user sees the display, the user will tend to think the in-vehicle system is up and operational. In short term, typically only the prioritized memory will be used. Thus, execution is not expected to be impacted with having only the prioritized content memory pages loaded initially.

In alternate embodiments, loading of the lower priority memory content that were not initially loaded may commence, after the in-vehicle system become nominally operationally, as opposed to waiting until the contents of these memory pages are accessed.

Figure 8:
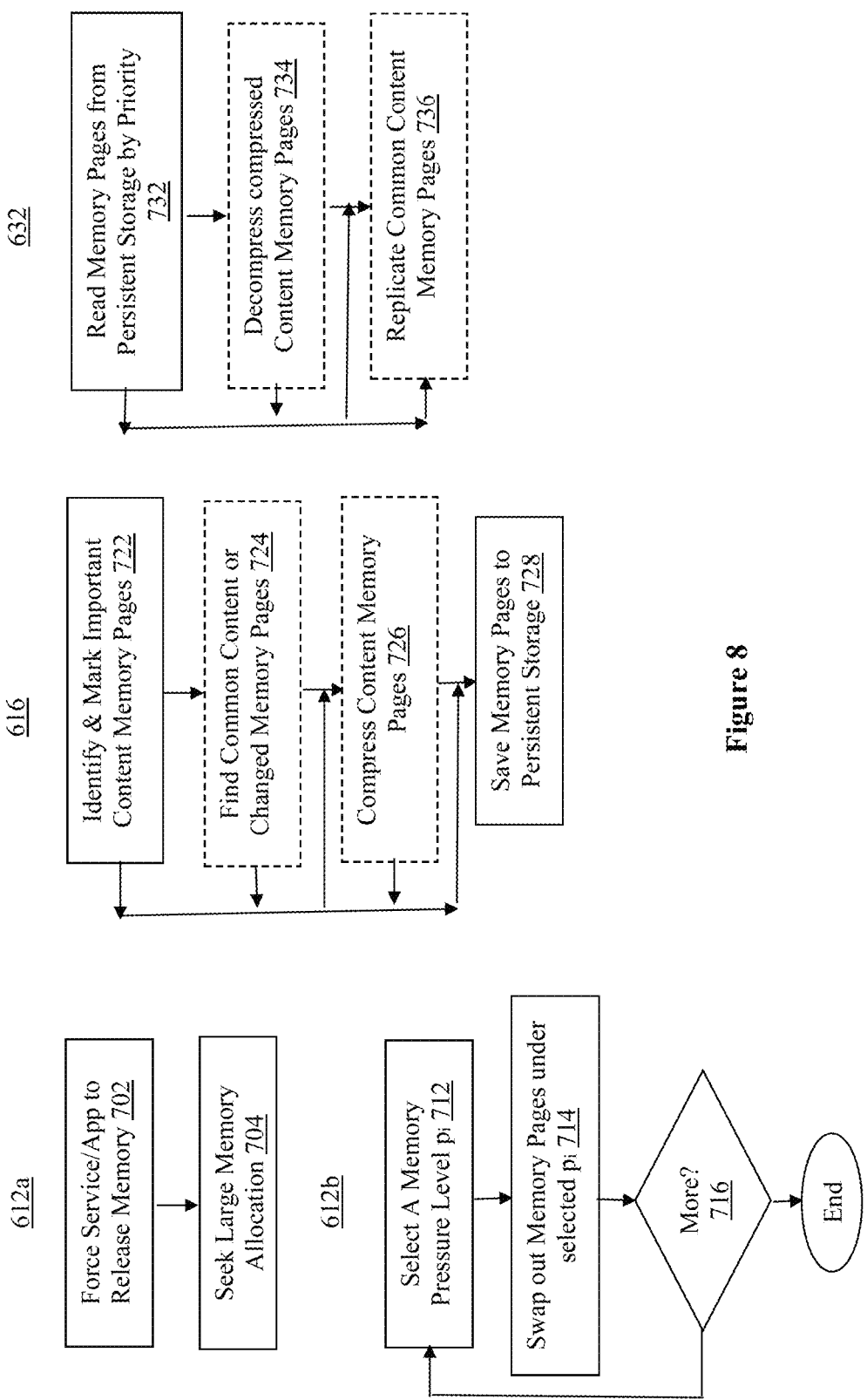
FIG. 8 illustrates example processes for shrinking a memory footprint, saving memory contents and restoring memory contents, according to various embodiments.

Referring now to FIG. 8, wherein example processes for shrinking a memory footprint, saving memory contents, and restoring memory contents, according to various embodiments, are illustrated. More specifically, two example processes 612a and 612b for shrinking memory footprint of a service/user VM, example process 616 for saving memory contents, and example process 618 for restoring memory contents, are illustrated. Example process 612a for shrinking memory footprint of a service/user VM includes operations performed at blocks 702-704, whereas example process 612b for shrinking memory footprint of a service/user VM includes operations performed at blocks 712-716. Example process 616 for saving memory content of a service/user VM may include operations performed at blocks 722-728, whereas example process 632 for restoring memory contents of a service/user VM may include operations performed at blocks 732-736. In embodiments, both processes 612a and 612b for shrinking the memory footprint are practiced.

Process 612a for shrinking memory footprint of a service/user VM starts at block 702. At block 702, the lesser important services/applications of a service/user VM, in terms of their immediate availability at power on, are forced to release the memory allocated to the services/applications. For example, in embodiments where the service/user OS is Android, the less important services/applications of a service/user VM may be switched into a background state to cause them to lose their memory allocation. At block 704, memory allocation may be sought (e.g., by memory shrink manager 210/310) to cause the OS of the user VM to reallocate memory from the applications. In embodiments, the OS may reallocate unused memory previously allocated to the applications. The OS may also compact usage of the previously allocated memory to the applications, to increase the amount of unused memory that can be free and reallocated from the applications. The reallocated memory pages (e.g., to memory shrink manager 210/310) will not be saved to persistent storage, thus shortening the time to resume the computing platform of the in-vehicle system (lesser amount of memory pages to be restored). Note that, in general, the amount of time it takes to suspend the computing platform of an in-vehicle system in a vehicle when the engine is keyed off is not critical. In other words, in general, there is no requirement that the power off of the computing platform of an in-vehicle system has to occur within certain seconds after the engine of the vehicle is keyed off.

Process 612b for shrinking memory footprint of a service/user VM starts at block 712. The process swaps memory of the service/user VM to a swap space on a persistent storage. At block 712, a specific memory pressure level ($p_i$) may be selected. Typically, the pressure level may be selected from low to high. At block 714, the memory content of the memory pages under the selected pressure level may be swapped out to a swap space on a persistent storage. At block 716, a determination may be made on whether there are more memory pages to be swapped out. If a result of the determination indicates memory pages of at least one higher pressure level needs to be swapped, process 612b returns to block 712, and continues therefrom as earlier described. If the result of the determination indicates all memory pages need to be swapped out have been swapped out, process 612b ends.

In embodiments, the swapping process may stop after memory content of memory pages below certain pressure level threshold have been swapped. The memory content of the memory pages swapped out are typically considered to be unimportant, and are not loaded during the resume process. These lower priority contents are loaded via the OS on-demand paging mechanism of the guest VM.

Process 616 starts at block 722. At block 722, memory pages with important contents are identified and marked. Typically, importance is defined in terms of the need of having their content immediately available after power up, whether for critical operations or for user experience. Next, from block 722, after marking all the important content pages, process 616 may proceed directly to block 728, to save the memory pages in order of their importance, or to one of optional blocks 724-726, to further reduce the amount of memory pages that need to be saved (for subsequent resume while power on). At block 728, memory pages are saved to persistent storage, in order of their importance. The more important (higher priority) memory pages will be loaded during resume, while the lesser important (lower priority) memory pages will be loaded on demand in a "lazy" manner.

At optional block 724, a process may be initiated to identify and mark the memory pages having the same content. For each set of memory pages having identical, e.g., some of the kernel memory pages, if the service VM and the user VM have the same OS, only one memory page will be saved, at block 728. In some embodiments, another process may also be initiated to identify the changed large memory pages. Typically, the content of many large memory pages are not substantially changed. Only the large memory pages identified as having been changed would be saved to persistent storage later on. From block 724, process 616 may proceed directly to block 728 to save the unique/changed memory pages, or to optional block 726 to still further reduce the amount of memory pages that need to be saved. At block 728, unique/changed memory pages are saved to persistent storage, in order of their importance/priorities.

At optional block 726, the (unique/changed) memory pages to be saved are compressed to reduce the amount of persistent storage they need, as well as the time to reload them. For these embodiments, the (unique/changed) memory pages are saved in their compressed form (as opposed to plain text) at block 728 instead. From block 726, process 616 proceed to block 728 to save the compressed (unique/changed) memory pages, in order of their importance/priorities.

Process 632 for re-loading memory content of memory pages suspended to storage, during a resume process invoked while powering on, starts at block 732. At block 732, (unique) more important/high priority memory pages saved into persistent storage are reloaded into memory from persistent storage. The lesser important/lower priority memory pages will be skipped, and subsequently loaded on demand, after resume, in a lazy manner. Next, from block 732, process 632 may end or proceed to one of optional blocks 734-736, if action to reduce the amount of memory pages that need to be saved (for subsequent resume while power on) were taken during the suspend process. In particular, if the saved memory pages were compressed during the suspend process, process 632 proceeds to optional block 734. If the saved memory pages were not compressed during the suspend process, but only one copy of a set of identical memory pages was saved, process 632 proceed to optional block 736.

At optional block 734, the compressed memory pages are decompressed to recover their plain text. From block 734, process 632 may end, or proceed to optional block 736, if only one copy of a set of identical memory pages was saved during the suspend process. At block 736, the duplicate important memory pages are recreated.

An experimental system with eMMC storage of sequential read throughput of 200 MB/s, and OS images of about 2000 MB was set up with the above described architecture, incorporated with the disclosed fast cold boot technology. The cold boot time (without putting the fast cold boot technology into operation) was observed to be 11-13 seconds. Putting the fast cold boot technology into operation reduced the "cold boot" time to about 1-2 seconds. The memory footprint, without compression, was shrunk to about 1000 MB. With compression, the memory footprint was shrunk to about 500 MB.

With respect to the persistent storage requirement, non-volatile memory express (NVMe) solid state drive (SSD has endurance (usually >400 TBW) and performance (sequence read 2.5 GB/s). Considering a 12 years car lifetime, average 10 times of engine on/off per day, even without skipping the duplicate memory pages, the fast cold boot technology of the present disclosure merely contribute 12*365*10*500 MB=20.9TBW, which can be nearly neglected. For eMMC, which has 10,000 write cycles per cell for multi-level cells (MLC), and lower performance, the actual written amount (with the saving only changed large memory page option) is approximately 250 MB per boot cycle. It will increase the write data by 2.5 GB per day, which does not significantly impact the eMMC lifetime compared to the normal usage (maybe >50 GB per day). Furthermore, since eMMC price is relative inexpensive, to reduce the risk of impacting the main storage, a second eMMC can be added dedicated for the fast cold boot technology of the present disclosure. For a 16 GB eMMC, its lifetime can be 16 GB*10000/2.5 GB/365 days=175 years.

Figure 9:
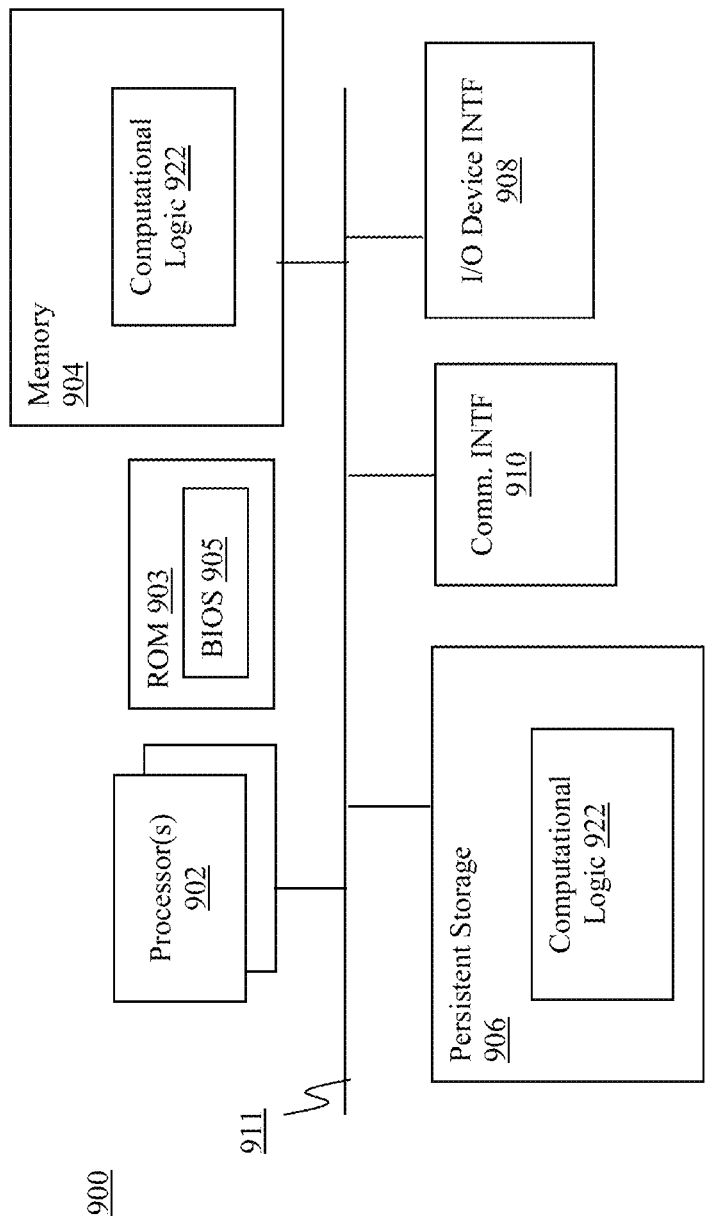
FIG. 9 illustrates an example computing platform suitable for use to practice aspects of the present disclosure, according to various embodiments.

FIG. 9 illustrates an example computing platform that may be suitable for use to practice selected aspects of the present disclosure. As shown, computing platform 900 may include one or more processors 902, each having one or more processor cores, read-only memory (ROM) 903, and system memory 904. Processors 902 may be any one of a number of processors known in the art. Similarly, ROM 903 may be any one of a number of ROM known in the art, and system memory 904 may be any one of a number of volatile storage known in the art.

Additionally, computing system 900 may include persistent storage devices 906. Example of persistent storage devices 906 may include, but are not limited to, flash drives, hard drives, compact disc read-only memory (CD-ROM) and so forth. Further, computer system 900 may include input/output devices 908 (such as display, keyboard, cursor control and so forth) and communication interfaces 910 (such as network interface cards, modems and so forth). The elements may be coupled to each other via system bus 912, which may represent one or more buses. In the case of multiple buses, they may be bridged by one or more bus bridges (not shown).

Each of these elements may perform its conventional functions known in the art. In particular, ROM 903 may include basic input/output system services (BIOS) 905 having a boot loader. System memory 904 and mass storage devices 906 may be employed to store a working copy and a permanent copy of the programming instructions implementing the operations associated with hypervisor 112, service/user OS of service/user VM 122-128, and components of fast cold boot technology 150 (such as memory shrink manager 210/310 and/or memory snapshot manager 208/308 having snapshot saver 202/302, "lazy" loader 204/304 and snapshot mapper 206/306), collectively referred to as computational logic 922. The various elements may be implemented by assembler instructions supported by processor(s) 902 or high-level languages, such as, for example, C, that can be compiled into such instructions.

Figure 10:
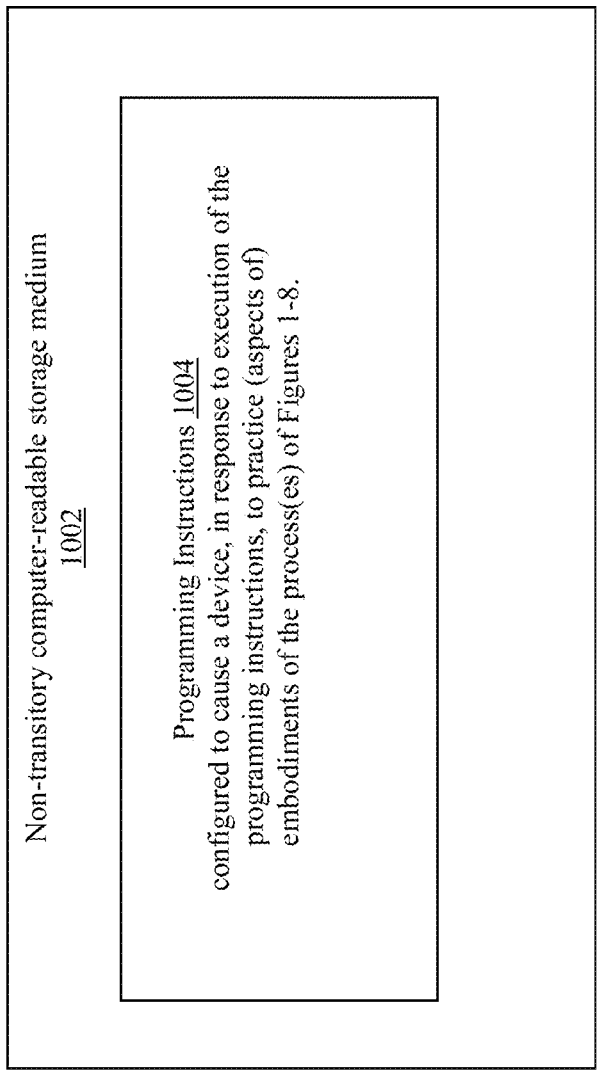
FIG. 10 illustrates a storage medium having instructions for practicing methods described with references to FIGS. 1-7, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computing platform 900, in response to execution of the programming instructions, to implement (aspects of) hypervisor 112, service/user OS of service/user VM 122-128, and components of fast cold boot technology 150 (such as memory shrink manager 210/310 and/or memory snapshot manager 208/308 having snapshot saver 202/302, "lazy" loader 204/304 and snapshot mapper 206/306). In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 9, for one embodiment, at least one of processors 902 may be packaged together with memory having aspects of computing logic 922. For one embodiment, at least one of processors 902 may be packaged together with memory having aspects of computing logic 922, to form a System in Package (SiP). For one embodiment, at least one of processors 902 may be integrated on the same die with memory having aspects of computing logic 922. For one embodiment, at least one of processors 902 may be packaged together with memory having aspects of computing logic 922, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 is an apparatus for in-vehicle computing, comprising: a computing platform having a hypervisor to host one or more virtual machines (VMs); a memory shrink manager to orchestrate shrinking a memory footprint of one of the one or more VMs for a suspend process to suspend the one VM to persistent storage, wherein the suspend process is invoked in response to the computing platform being powered off, and the computing platform proceeds to power off on suspension of the one VM to the persistent storage; and a memory snapshot manager to save the shrunken memory footprint of the one VM to the persistent storage during the suspend process, and to reload a subset of the saved shrunken memory footprint during a resume process to resume the one VM from suspension to the persistent storage, wherein the resume process is invoked in response to the computing platform being powered on, cold booted. The computing platform, the memory shrink manager, and the memory snapshot manager form at least a portion of an in-vehicle system of a vehicle that is powered off when an engine of the vehicle is turned off.

Example 2 is example 1, wherein to orchestrate shrinking of the memory footprint of the one VM for the suspend process, the memory shrink manager forces one or more services or applications of the one VM to release memory allocated to the one or more services or applications, or swaps out memory pages of the one or more services or applications of the one VM to a swap storage.

Example 3 is example 1, wherein the memory shrink manager further causes one or more devices of the one VM to be placed in a stateless mode for the suspend process.

Example 4 is example 1, wherein the memory snapshot manager includes a snapshot saver that prioritizes memory contents in the shrunken memory footprint and save the memory contents in the shrunken memory footprint into the persistent storage in order of their priorities.

Example 5 is example 4, wherein the snapshot saver further identifies identical memory pages of the prioritized memory contents in the shrunken memory footprint, and saves only one of each set of identical memory pages into the persistent storage.

Example 6 is example 4, wherein the snapshot saver further identifies changed memory pages of the prioritized memory contents in the shrunken memory footprint, and saves only changed memory pages into the persistent storage.

Example 7 is example 4, wherein the snapshot saver further compresses the prioritized memory contents in the shrunken memory footprint, prior to saving the compressed memory contents into the persistent storage in order of their priorities.

Example 8 is example 1, wherein the memory snapshot manager includes a memory loader arranged to reload the subset of the saved shrunken memory footprint from the persistent storage into memory of the computing platform, during the resume process.

Example 9 is example 8, wherein memory snapshot manager further includes a snapshot mapper arranged to establish a memory mapping for memory content of the saved shrunken memory footprint during the resume process, regardless whether the memory content of the saved shrunken memory footprint are part of the subset being reloaded during the resume process.

Example 10 is example 9, wherein the memory content of the saved shrunken memory footprint that are not part of the subset being reloaded during the resume process, are reloaded into the memory of the computing platform when they are subsequently accessed during operation.

Example 11 is any one of examples 1-10, wherein the one or more VMs comprise a service VM having a service operating system (OS) to host one or more system services, and a user application VM having a user OS to host one or more user applications. The memory shrink manager is disposed in the user application VM to shrink a memory footprint of the user application VM for the suspend process invoked while the computing platform is being powered off. And the memory snapshot manager is disposed in a service VM to establish a memory mapping for memory contents of the user application VM during the resume process invoked while the system is being powered on, cold boot.

Example 21 is any one of examples 1-10, wherein the one or more VMs comprise a service VM having a service operating system (OS) to host one or more system services, and a user application VM having a user OS to host one or more user applications. The memory shrink manager is disposed in the service VM to shrink a memory footprint of the service VM for the suspend process invoked while the computing platform is being powered off. And the memory snapshot manager is disposed in the hypervisor to establish a memory mapping for memory contents of the service VM during the resume process invoked while the system is being powered on.

Example 13 is a method for in-vehicle computing, comprising: receiving, by a computing platform of an in-vehicle system of a vehicle, a request to power off; preparing the computing platform, by the computing platform, in response to receipt of the request to power off, to resume at least a portion of the in-vehicle system from persistent storage when the computing platform is being powered up, cold boot; and powering the computing platform off, by the computing platform, on completion of the preparation to resume at least the portion of the in-vehicle system from persistent storage when the computing platform is being powered up, cold boot.

Example 14 is example 13, wherein preparing the computing platform, in response to receipt of the request to power off, to resume at least a portion of the in-vehicle system from persistent storage when being powered up, cold boot, comprises shrinking a memory footprint of the portion of the in-vehicle system, saving the shrunken memory footprint of the portion of the in-vehicle system into persistent storage, and suspending the portion of the in-vehicle system.

Example 15 is example 14, wherein shrinking a memory footprint of the portion of the in-vehicle system comprising forcing one or more services or applications of the portion of the in-vehicle system to release memory allocated to the one or more services or applications, or swaps out memory pages of the one or more services or applications of the portion of the in-vehicle system to a swap storage.

Example 16 is example 14, wherein shrinking a memory footprint of the portion of the in-vehicle system further includes prioritizing memory contents in the shrunken memory footprint and wherein saving the shrunken memory footprint of the portion of the in-vehicle system into persistent storage comprises saving the shrunken memory footprint of the portion of the in-vehicle system into persistent storage in order of their priorities.

Example 17 is example 16, wherein shrinking a memory footprint of the portion of the in-vehicle system further includes identifying identical memory pages of the memory contents in the shrunken memory footprint, and wherein saving the shrunken memory footprint of the portion of the in-vehicle system into persistent storage comprises saving only one of each set of identical memory pages into the persistent storage.

Example 18 is example 16, wherein saving the shrunken memory footprint of the portion of the in-vehicle system into persistent storage comprises compressing the memory contents in the shrunken memory footprint, prior to saving the compressed memory contents into the persistent storage in order of their priorities.

Example 19 is any one of examples 13-18, wherein preparing the computing platform, in response to receipt of the request to power off, to resume at least a portion of the in-vehicle system from persistent storage when being powered up, cold boot, comprises causing one or more devices of the portion of the in-vehicle system to be placed in a stateless mode for the suspend process.

Example 20 is at least one computer-readable medium (CRM) having instructions stored therein, to cause a computing platform of an in-vehicle system in a vehicle, in response to execution of the instruction, to: receive, via a boot program of the computing platform, a request to power on, cold boot the computing platform; in response, cold boot a hypervisor of the computing platform, by the boot program; and in lieu of cold booting a plurality of virtual machines, initiate a resume process to resume one or more of the plurality of virtual machines from persistent storage of the computing platform, the one or more virtual machines having been suspended to the persistent storage as part of a suspend process performed immediately before the computing platform was last powered off.

Example 21 is example 20, wherein to resume the one or more of the plurality of virtual machines from persistent storage comprises to reload a subset of saved shrunken memory footprint of the one or more virtual machines from the persistent storage into memory of the computing platform, during the resume process.

Example 22 is example 21, wherein to resume the one or more of the plurality of virtual machines from persistent storage further comprises to establish a memory mapping for memory content of the saved shrunken memory footprint during the resume process, regardless whether the memory content of the saved shrunken memory footprint are part of the subset being reloaded during the resume process.

Example 23 is example 22, wherein the memory content of the saved shrunken memory footprint that are not part of the subset being reloaded during the resume process, are reloaded into the memory of the computing platform when they are subsequently accessed during operation.

Example 24 is example 20, wherein the plurality of virtual machines comprise a service virtual machine having a service operating system (OS) to host one or more system services, and a plurality user application virtual machines, each having a user OS to host one or more user applications; and wherein to initiate a resume process to resume one or more of the plurality of virtual machines from persistent storage of the computing platform comprises to initiate a resume process to resume one or more of the user application virtual machines.

Example 25 is any one of examples 20-24, wherein the plurality of virtual machines comprise a service virtual machine having a service operating system (OS) to host one or more system services, and a plurality user application virtual machines, each having a user OS to host one or more user applications; and wherein to initiate a resume process to resume one or more of the plurality of virtual machines from persistent storage of the computing platform comprises to initiate a resume process to resume the service OS virtual machine.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for in-vehicle computing, comprising:
a computing platform having a hypervisor to host one or more virtual machines (VMs) instantiated on the hypervisor; and
a memory including instructions, which when executed by the computing platform, cause the computing platform to implement:
a memory shrink manager to orchestrate shrinking a memory footprint of one of the one or more VMs for a suspend process to suspend the one or more VMs to persistent storage, wherein the suspend process is invoked in response to the computing platform being initiated to power off, and the computing platform proceeds to power off on suspension of the one or more VMs to the persistent storage; and
a memory snapshot manager to save the shrunken memory footprint of the one or more VMs to the persistent storage during the suspend process, and to reload a subset of the saved shrunken memory footprint during a resume process to resume the one or more VMs from suspension to the persistent storage, wherein the resume process is invoked in response to the computing platform being powered on, cold booted;
wherein the memory snapshot manager comprises:
a snapshot saver that prioritizes storing memory contents in a predetermined order into the shrunken memory footprint, wherein the predetermined order is based on functionality of one or more operations associated with the vehicle that are initially rendered; and
a snapshot mapper arranged to establish a memory mapping for the memory contents of the saved shrunken memory footprint during the resume process, regardless whether the memory contents of the saved shrunken memory footprint are part of the subset being reloaded during the resume process, and to load a subset of the memory contents based on the predetermined order;
wherein the computing platform, the memory shrink manager, and the memory snapshot manager form at least a portion of an in-vehicle system of a vehicle that is powered off when an engine of the vehicle is turned off;
wherein the one or more VMs comprise a service VM having a service operating system (OS) to host one or more system services, and a user application VM having a user OS to host one or more user applications; and
wherein the memory shrink manager is disposed in the one of the one or more VMs to shrink a memory footprint of the one of the one or more VMs for the suspend process invoked while the computing platform is being powered off.

2. The apparatus of claim 1, wherein to orchestrate shrinking of the memory footprint of the one or more VMs for the suspend process, the memory shrink manager forces one or more services or applications of the one VM to release memory allocated to the one or more services or applications, or swaps out memory pages of the one or more services or applications of the one VM to a swap storage.

3. The apparatus of claim 1, wherein the memory shrink manager further causes one or more devices of the one or more VMs to be placed in a stateless mode for the suspend process.

4. The apparatus of claim 1, wherein the memory snapshot manager includes a snapshot saver that prioritizes memory contents in the shrunken memory footprint and saves the memory contents in the shrunken memory footprint into the persistent storage in order of their priorities.

5. The apparatus of claim 4, wherein the snapshot saver further identifies identical memory pages of the prioritized memory contents in the shrunken memory footprint, and saves only one of each set of identical memory pages into the persistent storage.

6. The apparatus of claim 4, wherein the snapshot saver further identifies changed memory pages of the prioritized memory contents in the shrunken memory footprint, and saves only changed memory pages into the persistent storage.

7. The apparatus of claim 4, wherein the snapshot saver further compresses the prioritized memory contents in the shrunken memory footprint to produce compressed memory contents, prior to saving the compressed memory contents into the persistent storage in order of their priorities.

8. The apparatus of claim 1, wherein the memory snapshot manager includes a memory loader arranged to reload the subset of the saved shrunken memory footprint from the persistent storage into memory of the computing platform, during the resume process.

9. The apparatus of claim 8, wherein memory snapshot manager further includes a snapshot mapper arranged to establish a memory mapping for memory content of the saved shrunken memory footprint during the resume process, regardless whether the memory content of the saved shrunken memory footprint are part of the subset being reloaded during the resume process.

10. The apparatus of claim 9, wherein the memory content of the saved shrunken memory footprint that are not part of the subset being reloaded during the resume process, are reloaded into the memory of the computing platform when they are subsequently accessed during operation.

11. The apparatus of claim 1, wherein the memory shrink manager is disposed in the user application VM to shrink a memory footprint of the user application VM for the suspend process invoked while the computing platform is being powered off; and wherein the memory snapshot manager is disposed in a service VM to establish a memory mapping for memory contents of the user application VM during the resume process invoked while the computing platform is being powered on, cold boot.

12. The apparatus of claim 1, wherein the memory shrink manager is disposed in the service VM to shrink a memory footprint of the service VM for the suspend process invoked while the computing platform is being powered off; and
wherein the memory snapshot manager is disposed in the hypervisor to establish a memory mapping for memory contents of the service VM during the resume process invoked while the computing platform is being powered on.

13. A method for managing in-vehicle computing, comprising:
instantiating one or more virtual machines (VMs) on a hypervisor executing a computing platform;
shrinking, via a memory shrink manager, a memory footprint of one of the one or more VMs for a suspend process to suspend the one or more VMs to persistent storage, wherein the suspend process is invoked in response to the computing platform being initiated to power off, and the computing platform proceeds to power off on suspension of the one or more VMs to the persistent storage;
saving, via a memory snapshot manager, the shrunken memory footprint of the one or more VMs to the persistent storage during the suspend process; and
reloading, via the memory snapshot manager, a subset of the saved shrunken memory footprint during a resume process to resume the one or more VMs from suspension to the persistent storage, wherein the resume process is invoked in response to the computing platform being powered on, cold booted;
wherein the memory snapshot manager comprises:
a snapshot saver that prioritizes storing memory contents in a predetermined order into the shrunken memory footprint, wherein the predetermined order is based on functionality of one or more operations associated with the vehicle that are initially rendered; and
a snapshot mapper arranged to establish a memory mapping for the memory contents of the saved shrunken memory footprint during the resume process, regardless whether the memory contents of the saved shrunken memory footprint are part of the subset being reloaded during the resume process, and to load a subset of the memory contents based on the predetermined order;
wherein the computing platform forms at least a portion of an in-vehicle system of a vehicle that is powered off when an engine of the vehicle is turned off;
wherein the one or more VMs comprise a service VM includes a service operating system (OS) to host one or more system services, and a user application VM includes a user OS to host one or more user applications; and
wherein the memory shrink manager is disposed in the one of the one or more VMs to shrink a memory footprint of the one of the one or more VMs for the suspend process invoked while the computing platform is being powered off.

14. The method of claim 13, wherein the memory shrink manager is disposed in the user application VM to shrink a memory footprint of the user application VM for the suspend process invoked while the computing platform is being powered off; and wherein the memory snapshot manager is disposed in a service VM to establish a memory mapping for memory contents of the user application VM during the resume process invoked while the computing platform is being powered on, cold boot.

15. The method of claim 13, wherein the memory shrink manager is disposed in the service VM to shrink a memory footprint of the service VM for the suspend process invoked while the computing platform is being powered off; and
wherein the memory snapshot manager is disposed in the hypervisor to establish a memory mapping for memory contents of the service VM during the resume process invoked while the computing platform is being powered on.

16. At least one non-transitory machine-readable medium having instructions for implementing a hypervisor to host one or more virtual machines (VMs) instantiated on the hypervisor, which when executed by a computing platform of an in-vehicle system in a vehicle, cause the computing platform to:
implement a memory shrink manager to orchestrate shrinking a memory footprint of one of the one or more VMs for a suspend process to suspend the one or more VMs to persistent storage, wherein the suspend process is invoked in response to the computing platform being initiated to power off, and the computing platform proceeds to power off on suspension of the one or more VMs to the persistent storage; and
implement a memory snapshot manager to save the shrunken memory footprint of the one or more VMs to the persistent storage during the suspend process, and to reload a subset of the saved shrunken memory footprint during a resume process to resume the one or more VMs from suspension to the persistent storage, wherein the resume process is invoked in response to the computing platform being powered on, cold booted;
wherein the memory snapshot manager comprises:
a snapshot saver that prioritizes storing memory contents in a predetermined order into the shrunken memory footprint, wherein the predetermined order is based on functionality of one or more operations associated with the vehicle that are initially rendered; and
a snapshot mapper arranged to establish a memory mapping for the memory contents of the saved shrunken memory footprint during the resume process, regardless whether the memory contents of the saved shrunken memory footprint are part of the subset being reloaded during the resume process, and to load a subset of the memory contents based on the predetermined order;
wherein the computing platform, the memory shrink manager, and the memory snapshot manager form at least a portion of the in-vehicle system of a vehicle that is powered off when an engine of the vehicle is turned off;
wherein the one or more VMs comprise a service VM having a service operating system (OS) to host one or more system services, and a user application VM having a user OS to host one or more user applications; and wherein the memory shrink manager is disposed in the one of the one or more VMs to shrink a memory footprint of the one of the one or more VMs for the suspend process invoked while the computing platform is being powered off.

17. The at least one non-transitory machine-readable medium of claim 16, wherein the memory shrink manager is disposed in the user application VM to shrink a memory footprint of the user application VM for the suspend process invoked while the computing platform is being powered off; and wherein the memory snapshot manager is disposed in a service VM to establish a memory mapping for memory contents of the user application VM during the resume process invoked while the computing platform is being powered on, cold boot.

18. The at least one non-transitory machine-readable medium of claim 16, wherein the memory shrink manager is disposed in the service VM to shrink a memory footprint of the service VM for the suspend process invoked while the computing platform is being powered off; and wherein the memory snapshot manager is disposed in the hypervisor to establish a memory mapping for memory contents of the service VM during the resume process invoked while the computing platform is being powered on.

* * * * *